J. L. HEFFNER.

MATTRESS.

APPLICATION FILED JUNE 29, 1914.

Reissued Sept. 21, 1915. 13,982.

Witnesses:—
H. V. Gibson.
Mary E. Comegys.

Inventor.
John L. Heffner
By E. M. Giles Atty.

UNITED STATES PATENT OFFICE.

JOHN L. HEFFNER, OF PEORIA, ILLINOIS.

MATTRESS.

13,982. Specification of Reissued Letters Patent. Reissued Sept. 21, 1915.

Original No. 1,029,928, dated June 18, 1912, Serial No. 671,801. Application for reissue filed June 29, 1914. Serial No. 848,107.

*To all whom it may concern:*

Be it known that I, JOHN L. HEFFNER, a citizen of the United States, residing at Peoria, in the county of Peoria and State of Illinois, have invented a new and useful Improvement in Mattresses, of which the following is a specification.

My invention relates more particularly to tufted mattresses or cushions.

The object of my invention is to provide a tufted mattress or cushion which is constructed so as to prevent stretching or enlarging of the mattress or cushion which has heretofore been experienced when it has been used for a time and the filling of the mattress becomes flattened or packed down.

My invention consists in taking up the material of the covering so as to provide looseness in the covering at the tufting centers to be drawn down into the filler of the mattress and also in the taking up of the covering so as to maintain the original dimensions of the mattress when the filling material becomes packed or flattened down.

Figure 1:
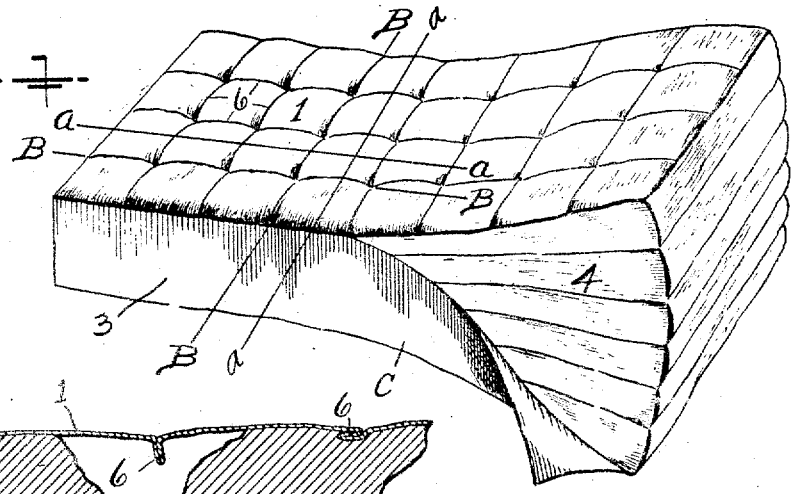
Figure 3:
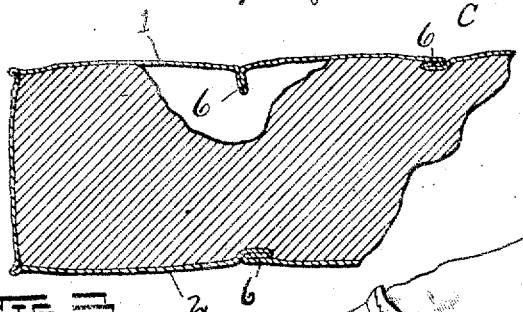
Figure 2:
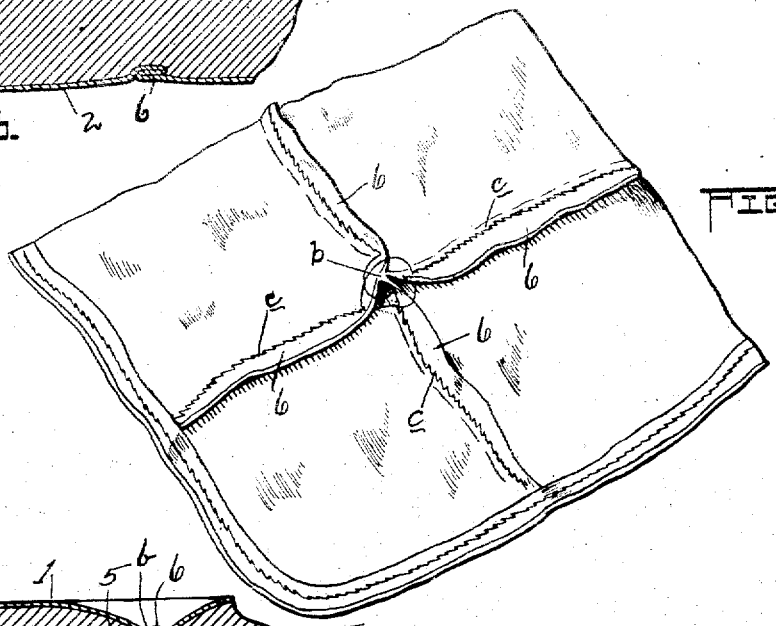

In the accompanying drawing which serves to illustrate my invention, Figure 1, is a perspective view showing a mattress partially completed; Fig. 2 is a perspective view showing a section of the covering for the mattress; Fig. 3 is a fragmentary sectional view taken on the line A—A of Fig. 1; and Fig. 4, a fragmentary sectional view on the line, B—B of Fig. 1.

Figure 4:
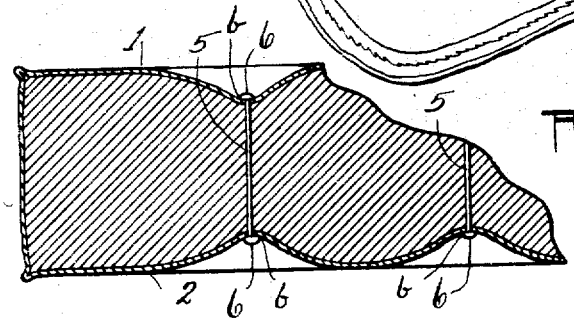

1 and 2 are the top and bottom covers respectively of the mattress and have the filling material 4 placed there between. The edges of the top and bottom covers are secured to the side-wall covering 3 which extends entirely around the mattress. At various places in the mattress the top and bottom coverings are drawn together by a cord 5, as shown in Fig. 4, forming what are commonly called tufting centers. This drawing in of the material at the tufting centers forms the material intermediate of the tufting centers in a convex curve as shown in Fig. 4 and takes up the material of the covering both in length and width. The material intermediate of the tufting centers as on the lines A—A of Fig. 1 is not drawn down into the filler but extends more nearly on a straight line across the length and also across the width of the mattress as shown in Fig. 3, and on account of the drawing in of the material at the tufting centers there is a certain amount of surplus material at points 6 on the line A—A. As the mattress is used the filler becomes flattened down and the material of the covering on the line B—B becomes more nearly a straight line and in mattresses heretofore constructed the surplus material at the points 6, on the lines A—A is released as the filler material is flattened down and the mattress is accordingly allowed to expand or enlarge both in length and width.

In carrying out my invention, I take a piece of material of greater length and width than that of the mattress desired to be formed. I then fold first, either on longitudinal or transverse lines at intervals the length of the material, then stitch, beginning at the edge on substantially a straight line to a certain point, then gradually curve the stitching until approximately the edge of the fold is reached, then the stitching is interrupted for a short distance on the fold, then stitching is resumed, beginning at substantially the edge of the fold, and thence on a curving line for a distance to substantially the edge of the fold, then again stitching is interrupted and again resumed, continuing across the material until approaching the other end thereof, when the stitching is continued approaching the edge on a substantially straight line, then the material is folded on transverse lines of the former folds, said folds crossing at points of interruption of the stitches in the former folds and the same plan of stitching is followed as in said former folds, thus leaving at the crossing points of the folds an interruption both in longitudinal and transverse stitching, which leaves material free at such points, enabling it to be readily unfolded, to be drawn down into the filling of the mattress. The longitudinal and transverse stitching is designed to be sufficiently continuous across the material and the interruptions in the stitching so short that generally the material will be held against longitudinal and transverse stretching, the interruptions in the stitching only being sufficient to permit the seating of the ordinary tufting button below the general surface of the mattress.

In my invention I take up the material of the covering at the points 6 sufficiently to provide the required looseness at the points *b* for the tufting centers, and also thereby prevent the enlargement of the mattress along the lines A—A as the filler material becomes flattened down and prevents stretching of the entire mattress as it is used. In practice I prefer to take up the material at points 6 by folding the material 2 and stitch the fold as at *e*, although any other means of taking up the material at these places will serve the purpose and is contemplated in my invention.

The top and bottom covers of the mattress are preferably exact duplicates with seams and centering points exactly matching so that when the filler is in the mattress and in tufting the needle is passed from centering point B on either the bottom or top covering, it will be passed to its matching centering point on the other side, thus producing an absolute uniformity of the tufting threads which will produce a perfectly square form.

The advantage resulting from the conformity of centering points of the respective top and bottom coverings, as distinguished from the uncertain and irregular passing of the tufting thread from one inclosing side to the other of the mattress, is that in such irregular tufting unequal strains are exerted on the inclosed material, thereby producing an irregular surface, which needs to be corrected by take up stitches through the sidewalls of the mattress to the top and bottom coverings.

In forming a mattress by my method, no take up stitch is absolutely necessary; however, it may be added as simply a supplement edge stiffener.

By employing my methods of providing surplus material at the tufting points and shaping the material by means of the particular manner of stitching the folds and matching the top and bottom coverings so as to produce corresponding centering points I am able to produce a mattress that will not stretch and that will permanently keep its box form.

I desire it understood that in tufting I may produce the biscuit, diamond, or other forms upon the surface also I do not desire to limit myself to the exact details of forming the top and bottom covering but claim broadly all structures that fall legitimately within the principle disclosed.

What I claim is:

1. In a device of the class described the combination of the filling material, a cover for said filling material, means for pulling the cover down into the filling material at a number of places to form tufting centers, and means intermediate of the tufting centers for taking up the cover to reduce the size of the said cover, said taking up means extending in a linear direction across the cover and interrupted adjacent the tufting centers whereby fullness is provided in the covering at the tufting centers to be drawn down into the filler.

2. In a mattress the combination of the filling material, a cover for said filling material having dimensions in excess of the completed mattress, means for pulling the cover down into the filler material at a number of places to form tufting centers, means adjacent and removed from the tufting centers for taking up the cover so as to reduce the size of the cover to correspond with the size of the completed mattress and to produce fullness at the tufting centers to be drawn into the filler of the mattress.

3. In a device of the class described, the combination of the filler material, a cover for the filler material, means connected with the covering material for pulling the covering material down into the body of the mattress at a number of places to form tufting centers and means for taking up the covering material around the tufting centers so as to leave fullness to be drawn down at the tufting centers and to hold the covering material from expansion.

4. In a device of the class described the combination of a filler material, a covering for the filler material, spaced means for drawing the covering material down into the filler material to form tufting centers, folds in the covering material extending between tufting centers, and means for locking the folds to prevent opening of the folds, said means and folds terminating short of the tufting centers.

5. In a device of the class described the combination of a filler material, a covering for the filler material, means for drawing the covering material down into the filler to form tufting centers, folds in the covering material extending away from the tufting centers and means extending lengthwise of the folds for locking the folds against unfolding, said means and folds terminating short of the tufting centers.

6. In a mattress, top and bottom coverings folded at intervals longitudinally and transversely intermediate the sides and ends, the sides of each fold being stitched together its entire length except short interruptions in the stitches at the crossing points sufficient to provide a fullness adapted to be drawn down into the filler of the mattress.

7. In a mattress, top and bottom coverings folded at intervals longitudinally and transversely, said folds being sewed together with short interruptions in the stitches at the centering points sufficient to provide a fullness adapted to be drawn down into the filler of the mattress, said folds being stitched on a gradually curved line, gradually digressing from the edge of the fold from the centering points to the intermediate point between said centers.

8. In a device of the class described, the combination of a filling material, a covering for said filling material, means for taking up at spaced intervals, and reducing the normal size of the covering, both on longitudinal and transverse lines to provide a fullness at points intermediate the take-up intervals, and means for drawing the fullness of the material into the filler between the take-up intervals.

9. In a mattress, in combination, side coverings, top and bottom coverings, means for taking up, at spaced intervals both longitudinally and transversely, the material of said top and bottom coverings into a fold and securing same against unfolding, whereby the material may be drawn into the filler to prevent stretching of the covering, and to provide fullness to be drawn down into the mattress, and means for drawing the fullness thereinto.

In testimony whereof I have affixed my signature in presence of two witnesses.

JOHN L. HEFFNER.

Witnesses:

MARY E. COMEGYS,

H. V. GIBSON.